US012567826B2

(12) United States Patent
Legall et al.

(10) Patent No.: US 12,567,826 B2
(45) Date of Patent: Mar. 3, 2026

(54) KIT FOR FASTENING A PANEL, PROVIDED WITH A HOLDING PART AND A CLAMPING ELEMENT, AND HOLDING PART AND CLAMPING ELEMENT OF THE FASTENING KIT

(71) Applicant: A. Raymond et Cie, Grenoble (FR)

(72) Inventors: Antoine Legall, Fontaine (FR); Julien Locatelli, Voiron (FR)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 18/854,400

(22) PCT Filed: Feb. 15, 2023

(86) PCT No.: PCT/EP2023/053786
§ 371 (c)(1),
(2) Date: Oct. 4, 2024

(87) PCT Pub. No.: WO2023/193984
PCT Pub. Date: Oct. 12, 2023

(65) Prior Publication Data
US 2025/0247040 A1 Jul. 31, 2025

(30) Foreign Application Priority Data
Apr. 6, 2022 (FR) ...................................... 2203149

(51) Int. Cl.
*H02S 30/10* (2014.01)
*F16B 5/06* (2006.01)
(Continued)

(52) U.S. Cl.
CPC ............ *H02S 20/20* (2014.12); *F16B 5/0685* (2013.01); *F16B 2/20* (2013.01)

(58) Field of Classification Search
CPC ........ H02S 20/20; H02S 20/00; F16B 5/0685; F16B 2/20; F16B 21/082; F24S 2025/014;
(Continued)

(56) References Cited

U.S. PATENT DOCUMENTS 9,160,273 B2 10/2015 Schuit et al.
9,705,447 B2 * 7/2017 Cavieres ................. F16B 5/125
(Continued)

FOREIGN PATENT DOCUMENTS

DE 102011114935 A1 4/2013
EP 2867541 B1 11/2017
EP 3842707 A1 6/2021

OTHER PUBLICATIONS

French Search Report for Application No. 2203149 dated Nov. 18, 2022, 2 pages.
(Continued)

*Primary Examiner* — Amy J. Sterling
(74) *Attorney, Agent, or Firm* — TraskBritt

(57) ABSTRACT

A holding part includes: a main part that extends along an elongation axis A and comprises a first side wall, the first side wall having a first inner face and a first outer face as well as a first upper edge parallel to the elongation axis A. The main portion has two transverse walls that are perpendicular to the elongation axis and define a passage open at the rear face for the insertion of a clamping element of the fastening kit. The transverse walls have a holding edge defining a holding plane and against which the clamping element is intended to exert force. The holding part also includes a first lateral wing extending the main portion laterally and intended to bear against a useful face of the panel opposite the contact face.

29 Claims, 8 Drawing Sheets

(51) Int. Cl.
*H02S 20/20* (2014.01)
*F16B 2/20* (2006.01)

(58) Field of Classification Search
CPC ...... F24S 25/634; F24S 25/636; F24S 25/613;
Y02E 10/47
See application file for complete search history.

(56) References Cited

U.S. PATENT DOCUMENTS

| | | | | |
|---|---|---|---|---|
| 9,813,012 | B2 * | 11/2017 | Wentworth | F24S 25/33 |
| 10,305,416 | B2 * | 5/2019 | Zhu | H02S 20/23 |
| 12,143,061 | B2 * | 11/2024 | Cavieres Pinilla | H02S 30/10 |
| 2021/0396255 | A1 | 12/2021 | Watson et al. | |

OTHER PUBLICATIONS

International Search Report for Application No. PCT/EP2023/053786 dated May 10, 2023, 2 pages.
International Written Opinion for Application No. PCT/EP2023/053786 dated May 10, 2023, 12 pages with machine translation.

* cited by examiner

500

100

300

403A        403B
402A        402B
400
401

315A,315B
319

KIT FOR FASTENING A PANEL, PROVIDED WITH A HOLDING PART AND A CLAMPING ELEMENT, AND HOLDING PART AND CLAMPING ELEMENT OF THE FASTENING KIT

CROSS-REFERENCE TO RELATED APPLICATIONS

This application is a national phase entry under 35 U.S.C. § 371 of International Patent Application PCT/EP2023/053786, filed Feb. 15, 2023, designating the United States of America and published as International Patent Publication WO 2023/193984 A1 on Oct. 12, 2023, which claims the benefit under Article 8 of the Patent Cooperation Treaty of French Patent Application Serial No. FR2203149, filed Apr. 6, 2022.

TECHNICAL FIELD

The present disclosure relates to the field of fixing means, and more particularly means for fixing panels, for example, solar panels, to rails.

In particular, the invention relates to a retaining part and a clamping element making it possible to fix panels to rails. In particular, the retaining part and the clamping element are configured to allow the panel to be clamped against the rail.

BACKGROUND

Document U.S. Pat. No. 9,160,273 discloses a fixing kit for fixing a panel, and, in particular, a solar panel, on a rail. In this respect, and as shown in [FIG. 7] of document U.S. Pat. No. 9,160,273, the fixing kit comprises a retaining element 31, a bolt 30 and a slide element 1.

In operation, the assembly formed by these three elements is arranged between two adjacent panels resting on a rail 8. More specifically, the assembly comprises, in order and starting from the rail, the slide element 1, the bolt 30 and the retaining element 31. The retaining element 31 comprises a metal plate provided with opposite edges, called retaining edges, each intended to be retained clamped against an upper peripheral part 36 of the frame of two adjacent panels. The slide element 1 is in sliding connection with the rail 8 and the bolt 30 makes it possible to ensure the clamping of the two retaining edges. In particular, the bolt 30, passing through the retaining element, is screwed into a tapped hole in an upper portion of the slide element 1, in order to allow the retaining element to be clamped against each of two adjacent panels.

However, this fixing kit implementing clamping by way of a bolt or a screw is not satisfactory.

Indeed, the bolt can loosen over time and, for example, under the effect of temperature variations. This loosening has the effect of reducing the retaining force exerted by the retaining element on the panel, and can ultimately lead to separation of the panel and the rail. By ripple effect, the grip of the adjacent panels on the rail can also be reduced and they in turn may disengage from the rail.

Furthermore, the slide element, which is not very accessible, is difficult to replace if necessary.

Document EP2867541 proposes a fixing device making it possible to overcome these problems. This fixing device is, in particular, a one-piece device and is provided with snap-fastening means intended to cooperate with the rail. Nevertheless, implementing this fixing device requires considering relatively wide, and therefore more expensive, rails in order to allow easier dismantling when the situation requires it.

BRIEF SUMMARY

One object of the present disclosure is therefore to provide a retaining part, a clamping element and an attachment kit allowing permanent clamping of a panel against a rail.

Another object of the present disclosure is to provide a retaining part, a clamping element and an attachment kit for which the bearing force is better distributed.

Another object of the present disclosure is to provide a retaining part, a clamping element and an attachment kit allowing rails of reduced width to be considered.

Another object of the present disclosure is to propose a retaining part, a clamping element and an attachment kit that remain easy to dismantle with regard to the known devices of the state of the art.

The present disclosure relates to a retaining part, pre-formed and one-piece, of an attachment kit intended to retain a panel clamped by one of its faces, called the contact face, against a rail, the retaining part comprising:

Retaining part, preformed and one-piece, of an attachment kit intended to retain a panel clamped by one of its faces, called the contact face, against a rail, the retaining part comprising:

a main part extending along an elongation axis A, and which comprises a first side wall, the first side wall having a first inner face and a first outer face as well as a first upper edge parallel to the elongation axis A and opposite a rear face of the main part; the main part further comprises two transverse walls, perpendicular to the elongation axis and which delimit a passage open through the rear face for the insertion of a clamping element of the attachment kit; the transverse walls further comprise a retaining edge defining a retaining plane, opposite the rear face, and against which the clamping element inserted through the rear face is intended to exert a force in the direction of the rear face; and a first lateral wing laterally extending the main part from the first upper edge, the first lateral wing being intended to bear by a bearing surface against a working face of the panel opposite the contact face.

According to one embodiment, the faces of the transverse walls facing one another, called guide faces, each comprise, from the retaining edge toward an inlet edge opposite the retaining edge, a retaining section, a guide section and an inlet section; the guide section is flat and perpendicular to the elongation axis, and the inlet section is of convex shape so as to limit any contact between the clamping element and a rim of the inlet edge during insertion of the clamping element into the passage through the rear face.

According to one embodiment, the retaining section is also of convex shape so that the retaining plane is not perpendicular to the guide section.

According to one embodiment, the retaining section comprises contact tips projecting relative to the retaining plane.

According to one embodiment, the first side wall also comprises at least one guide fin formed by a bent section of the first side wall and arranged to center and guide the clamping element during its insertion into the passage through the rear face.

According to one embodiment, the at least one guide fin is oriented toward the rear face and bent in a direction opposite the first inner face.

According to one embodiment, the angle between the first side wall and the first lateral wing is less than 90°.

According to one embodiment, the first lateral wing comprises one or more bent tabs projecting toward the rear face and ending in a tip so as to be able to scratch the panel when the first lateral wing bears against the panel.

According to one embodiment, the main part comprises a second side wall having a second inner face and a second outer face as well as a second upper edge parallel to the elongation axis and opposite a rear face of the main part, and a second lateral wing is moreover arranged projecting with respect to the second outer face and extends the second side wall from its second upper edge.

According to one embodiment, the retaining part is arranged so that the first side wall and the first lateral wing are symmetrical, respectively, to the second side wall and the second wing with respect to a plane of symmetry median to the first inner surface and to the second inner surface.

According to one embodiment, the first side wall and the second side wall are parallel to one another.

According to one embodiment, the transverse walls extend between the first inner surface and the second inner surface.

According to one embodiment, beams provide a fixed mechanical link between the first side wall and the second side wall.

According to one embodiment, the beams are arranged on the rear face of the main part.

According to one embodiment, one beam among the beams, called the mounting beam, is arranged halfway between the two transverse walls.

According to one embodiment, the retaining part comprises a retaining bottom of flat shape and which extends from and perpendicular to the first inner face.

According to one embodiment, the retaining bottom comprises a through opening.

According to one embodiment, the retaining bottom connects the first inner face with the second inner face.

According to one embodiment, the retaining part comprises means, called captive means, configured to trap a bolt or a screw inserted in the through opening in a direction from the face front to rear face.

According to one embodiment, the captive means comprise a first tab and a second tab that extend in a direction from the rear face toward the front face and in projection relative to the retaining bottom.

The present disclosure also relates to a one-piece clamping element intended to cooperate with the retaining part according to the present disclosure for clamping a panel by its contact face against a U-section rail, the clamping element comprising two uprights mechanically secured to one another and which extend, in a plane P, each from their first end toward their second end in two divergent directions; the first ends comprise first anchoring means arranged to allow the clamping element to be attached to the rail by snap-fastening, while the second ends comprise second anchoring means intended to cooperate with one of the retaining edges when the two uprights are inserted into the passage through the rear face.

According to one embodiment, the clamping element comprises a beam, which extends in the plane P, and which secures the two uprights together.

According to one embodiment, the first anchoring means and the second anchoring means of a given upright comprise, respectively, a first lateral abutment and a second lateral abutment facing one another.

According to one embodiment, the uprights comprise pre-mounting means making it possible to fix the clamping element to the rail without clamping in order to allow prepositioning of the panel on the rail.

According to one embodiment, each upright comprises a mounting hook in the extension of its second end, the two mounting hooks being bent or curved outwardly.

According to one embodiment, the pre-mounting means for a given upright are arranged between the mounting hook and the first lateral abutment.

The present disclosure also relates to an attachment kit that comprises:

a retaining part according to the present disclosure; and a clamping element according to the present disclosure.

The present disclosure also relates to a panel attachment system, which comprises at least one attachment kit according to the present disclosure and at least one U-section rail.

The present disclosure also relates to a flat surface provided with a set of panels arranged in a matrix manner on regularly spaced and parallel rails, each panel being clamped against a rail on which it rests by way of an attachment kit according to the present disclosure.

BRIEF DESCRIPTION OF THE DRAWINGS

Further features and advantages of the present disclosure will become apparent from the following detailed description of a retaining part and a clamping element according to the present disclosure, with reference to the accompanying figures, wherein:

FIG. 4, in particular, shows the transverse wall on which the contact tips are formed;

DETAILED DESCRIPTION

The present disclosure relates to a preformed, one-piece retaining part of an attachment kit intended to retain a panel, for example, a solar panel, on a rail. More particularly, the retaining part is intended to retain the panel clamped by one of its faces, called the contact face, against the rail.

In this respect, the retaining part comprises:

a main part extending along an elongation axis A, and which comprises a first side wall, the first side wall having a first inner face and a first outer face as well as a first upper edge parallel to the elongation axis A and opposite a rear face of the main part; the main part further comprises two transverse walls, perpendicular to the elongation axis and which delimit a passage open through the rear face for the insertion of a clamping element of the attachment kit; the transverse walls further comprise a retaining edge defining a retaining plane, opposite the rear face, and against which the clamping element inserted through the rear face is intended to exert a force in the direction of the rear face; and a first lateral wing laterally extending the main part from the first upper edge, the first lateral wing being intended to bear by a bearing surface against a working face of the panel opposite the contact face.

The present disclosure also relates to a one-piece clamping element intended to cooperate with the retaining part for clamping a panel by its contact face against a U-section rail. In these regards, the clamping element comprises two uprights mechanically secured to one another and which extend, in a plane P, each from their first end toward their second end in two divergent directions. The first ends are arranged to allow the clamping element to be attached to the rail by snap-fastening, while the second ends each comprise a lateral abutment intended to cooperate with one of the retaining edges when the two uprights are inserted into the passage through the rear face.

The present disclosure also relates to an attachment kit provided with a retaining part and a clamping element.

Finally, the present disclosure also relates to an attachment system that comprises at least one attachment kit and at least one rail, in particular, a U-section rail.

Figure 1:
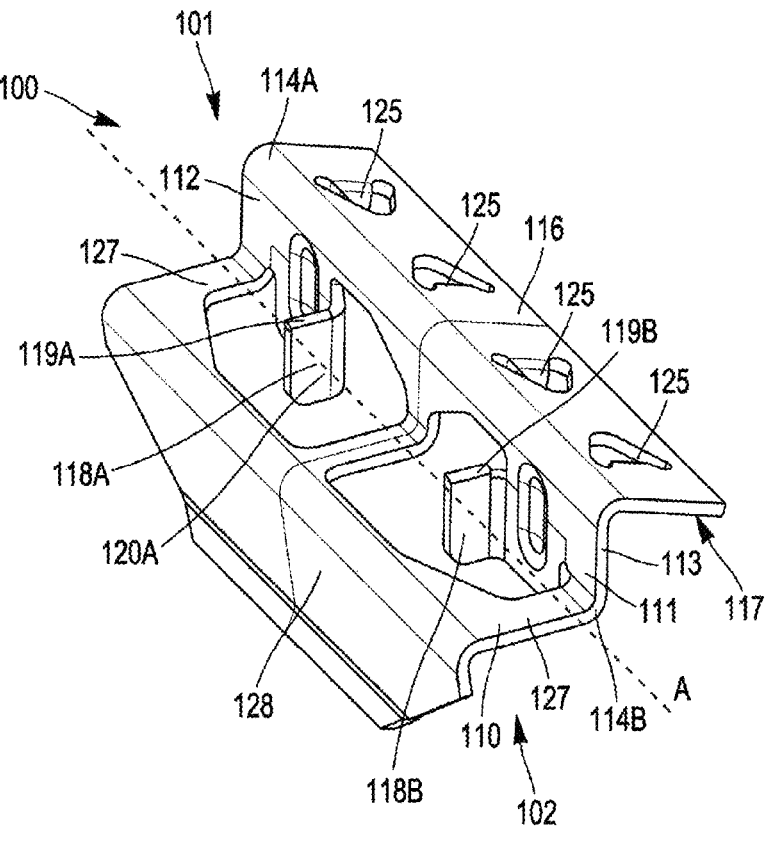
FIG. 1 is a perspective illustration of a first embodiment of a retaining part according to the present disclosure; the perspective illustration is, in particular, oriented so as to observe the first inner face and the front face.

FIG. 1 shows a first embodiment of a one-piece retaining part 100 according to the present disclosure.

The retaining part 100 comprises a front face 101 and a rear face 102 opposite the front face.

The retaining part 100 comprises a main part 110 that extends along an elongation axis A. In particular, the main part 110 comprises a first side wall 111 provided with two substantially parallel faces referred to as, respectively, first inner face 112 and first outer face 113. It is understood, without it being necessary to specify it, that the first side wall 111 forms a plane defined by an axis parallel to the elongation axis A and another axis, advantageously perpendicular to the elongation axis A.

The first side wall 111 also comprises a first upper edge 114A that extends parallel to the elongation axis A and that is opposite the rear face 102 of the retaining part 100.

The retaining part 100 also comprises two transverse walls 118A and 118B, perpendicular to the elongation axis A. The two transverse walls 118A and 118B delimit a passage open through the rear face 102 for the insertion of a clamping element of the attachment kit. The transverse walls 118A and 118B further comprise a retaining edge 119A, 119B forming a retaining plane, opposite the rear face 102, and against which the clamping element, inserted in the passage through the rear face 102, is intended to exert a force in the direction of the rear face 102.

Figure 4:
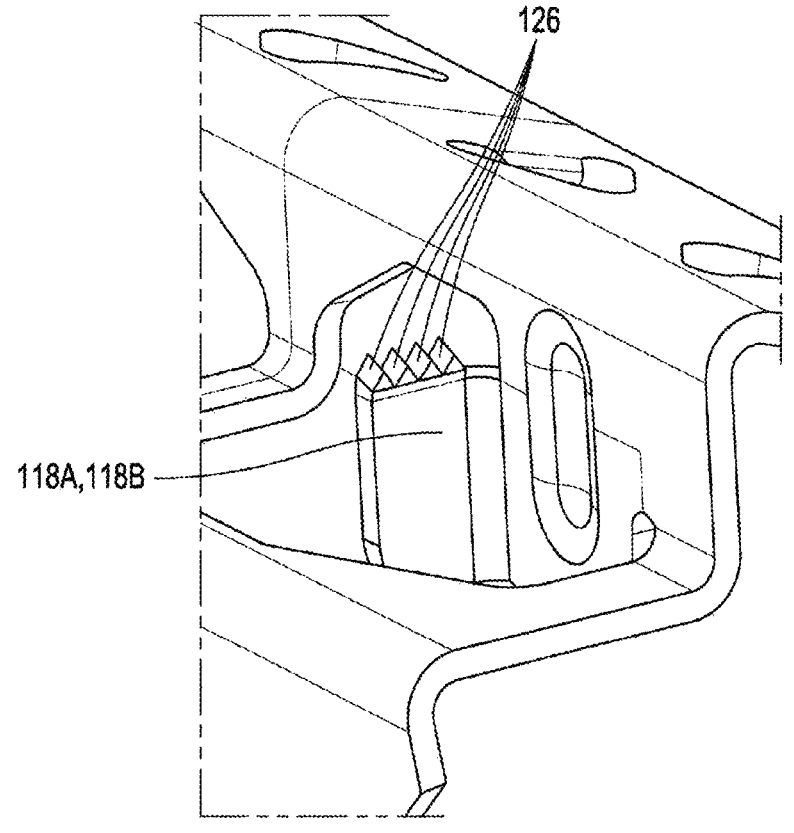
FIG. 4 is an illustration of a transverse wall of the retaining part of FIG. 1 and by a face opposite its guide face.

Each transverse wall 118A and 118B can include tips, called contact tips 126, projecting relative to the retaining plane (FIG. 4).

Advantageously, the transverse walls 118A and 118B extend from the first inner face 112. However, the present disclosure is not limited to this aspect alone and those skilled in the art may consider transverse walls 118A and 118B that each extend from beams 127 perpendicular to the first side wall 111. In particular, these beams can extend from a first lower edge 114B, opposite the first upper edge 114A, of the first side wall 111.

The retaining part 100 can comprise a wedge 128 linked to the beams 127. The wedge 128, in particular, extends the beams 127 by one of their ends opposite the first lower edge 114B, and projects relative to the rear face 102.

Figure 2:
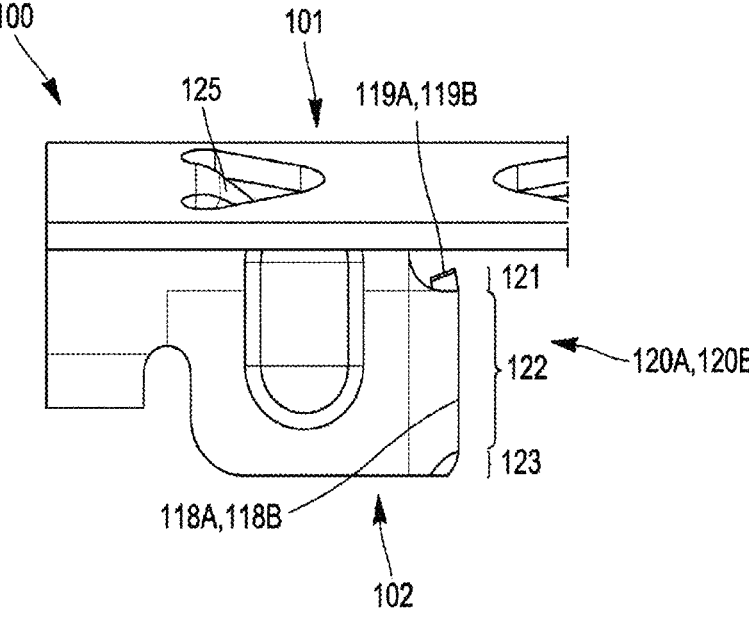
FIG. 2 shows an enlargement of a section of the retaining part of FIG. 1 in side view to observe the first outer face.

Advantageously, the transverse walls 118A and 118B each comprise a face, called the guide face 120A and 120B, facing one another, and delimiting the passage opened through the rear face 102 (FIG. 1 and FIG. 2).

More particularly, and as shown in FIG. 2, each guide face 120A and 120B comprises, from its retaining edge 119A and 119B toward an edge called the inlet edge, opposite the retaining edge, a retaining section 121, a guide section 122 and an inlet section 123. The guide section 122 is flat and perpendicular to the elongation axis, and the inlet section 123 is of convex shape so as to limit any contact between the clamping element and a rim of the inlet edge during insertion of the clamping element into the passage through the rear face 102.

Advantageously, the retaining section 121 is also of convex shape so that the retaining plane is not perpendicular to the guide section 122. This arrangement should allow better gripping of the clamping element described below.

The retaining part 100 further comprises a first lateral wing 116 laterally extending the main part 110 from the first upper edge 114A. The first lateral wing 116 is, in particular, intended to bear by a bearing surface 117 against a working face of the panel opposite the contact face of the panel. It is understood that the bearing surface 117 of the first lateral wing 116 is opposite the front face 101.

The first lateral wing 116 is preferably flat. However, the present disclosure is not limited to this aspect, and those skilled in the art may consider a first lateral wing 116 that is not flat and that more particularly is curved. For example, the first lateral wing 116 has, via the front face, a convex shape.

It is understood, without it being necessary to specify it, that the two transverse walls 118A and 118B, on the one hand, and the first lateral wing 116, on the other hand, are arranged on either side of the first side wall 111.

Advantageously, the angle between the first side wall 111 and the first lateral wing 116 is less than 90°, advantageously less than 80°.

Still advantageously, the first lateral wing 116 comprises one or more bent tabs 125 projecting toward the rear face 102 and ending in a tip so as to be able to scratch the panel when the first lateral wing 116 bears against the panel.

Figure 3:
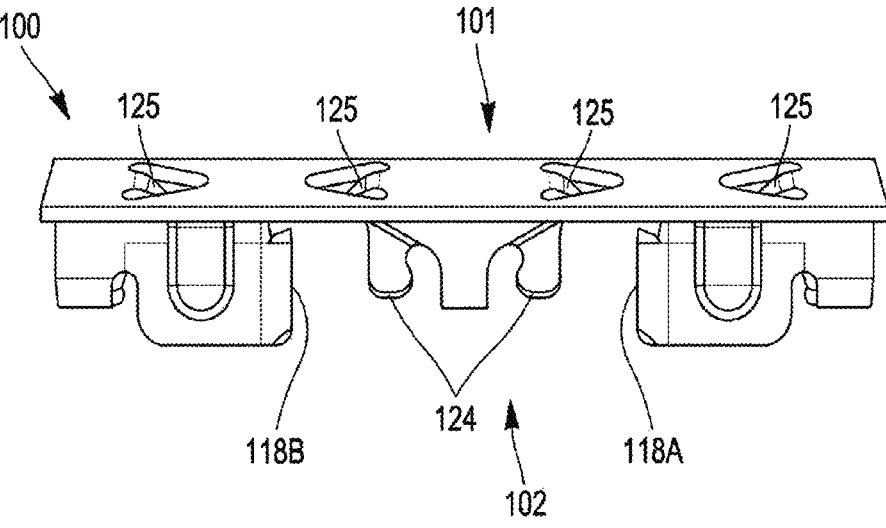
FIG. 3 shows the retaining part of FIG. 1 in side view to observe the first outer face in its entirety.

Advantageously, as shown in FIG. 3, the first side wall 111 can also comprise at least one guide fin 124 (for example, two guide fins) formed by a bent section of the first side wall 111. The at least one guide fin 124 is, in particular, arranged to center and guide the clamping element when it is inserted into the passage via the rear face 102. More particularly, the at least one guide fin 124 is oriented toward the rear face 102 and bent in a direction opposite the first inner face 112.

Figure 5:
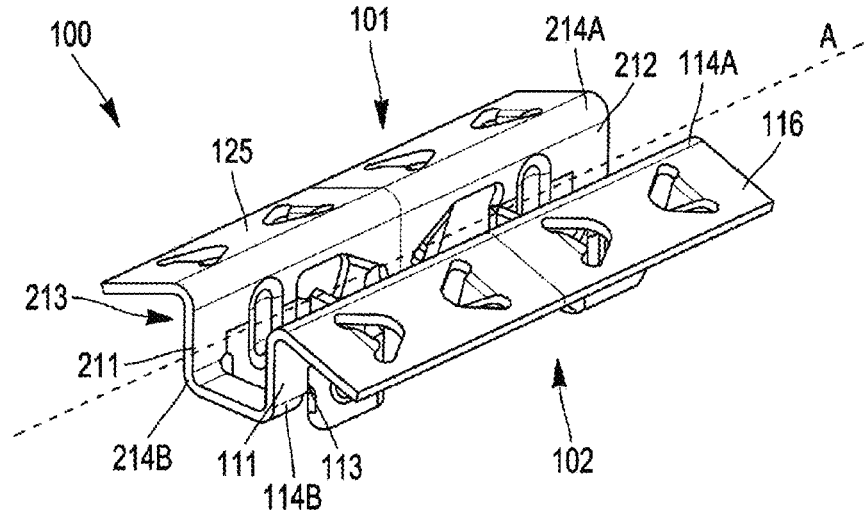
FIG. 5 is a perspective illustration of a second example of a retaining part according to the present disclosure; the perspective illustration is, in particular, oriented so as to observe the first outer face and the front face.

FIG. 5 is an illustration of a second embodiment of a one-piece retaining part 100 according to the present disclosure. In this second example, the retaining part 100 essentially takes up all the features described in relation to the first example. According to this second example, the retaining part 100 does not, however, comprise the wedge 128.

According to this second example, the main part comprises a second side wall 211. The second wall 211 has a second inner face 212 and a second outer face 213 as well as a second upper edge 214A parallel to the elongation axis A and opposite a rear face 102.

The retaining part 100 according to this second example also comprises a second lateral wing 216 projecting relative to the second outer face 213 and which extends the second side wall 211 from its second upper edge 214A.

More particularly, the retaining part 100 according to this second example is arranged so that the first wall 111 and the first lateral wing 116 are symmetrical, respectively, to the second side wall 211 and the second wing 216 with respect to a plane of symmetry median to the first inner surface 112 and to the second inner surface 212. Advantageously, the first wall 111 and the second wall 211 are parallel to one another.

Still advantageously, the transverse walls 118A and 118B extend between the first inner surface 112 and the second inner face 212.

Figure 6:
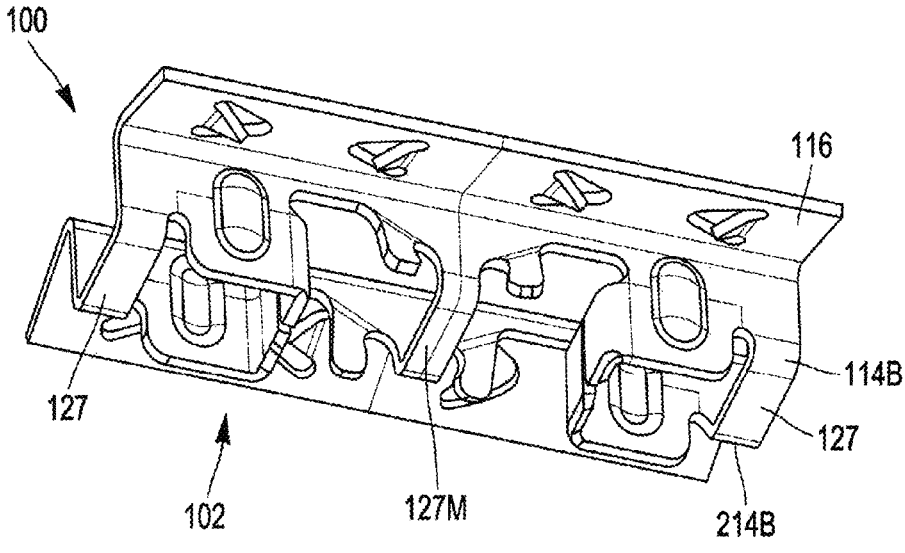
FIG. 6 a perspective illustration of the retaining part of FIG. 5; the perspective illustration is particularly oriented so as to observe the first outer face and the rear face.

The retaining part 100 can also comprise the beams 127 and 127M, which provide a fixed mechanical link between the first wall 111 and the second wall 211 (FIG. 6).

The beams 127 and 127M are arranged on the rear face 102 of the main part 110. More particularly, the beams 127 and 127M connect the first lower edge 114B to a second lower edge 214B of the second wall and opposite the second upper edge 214A.

Advantageously, one beam among the beams 127, called the mounting beam 127M, is arranged halfway between the two transverse walls 118A and 118B.

Figure 7:
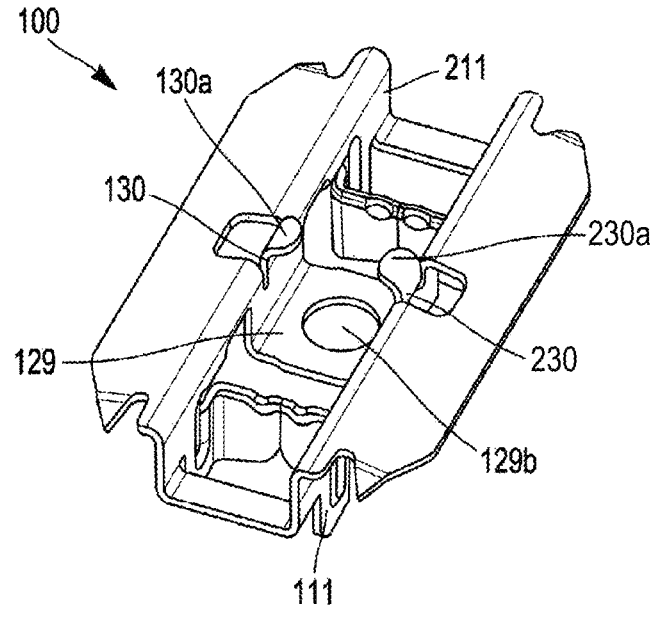
FIG. 7 is a perspective illustration of the retaining part according to a third embodiment of the present disclosure.

FIG. 7 is an illustration of a third embodiment of a one-piece retaining part 100 according to the present disclosure. In this third example, the retaining part 100 essentially takes up all the features of the first and/or the second embodiment of the retaining part according to the present disclosure. According to this third example, the retaining part 100 comprises a retaining bottom 129 of essentially flat shape and which extends perpendicularly to the first wall 111 and from the first inner face 112. More particularly, the retaining bottom 129 comprises a through opening 129b and is placed halfway between the two transverse walls 118A and 118B.

It is understood that the retaining bottom 129 is considered, in this third example, in place of the retaining beam 127M. In this respect, when the second main wall 211, according to the terms of the second example, is considered, the retaining bottom 129 mechanically connects the second wall 211 and the first wall 111. More particularly, and according to this last aspect, the retaining bottom 129 connects the first inner face 112 and the second inner face 212.

In addition, the retaining bottom 129 can be at a distance from the first upper edge 114A and from the second upper edge 214A.

In a particularly advantageous manner, the retaining part 100 according to this third example can comprise captive means configured to trap a screw or a bolt inserted into the opening in a direction going from the front face 101 toward the rear face 102. In this regard, the captive means may, in particular, comprise two tabs, respectively called first tab 130 and second tab 230, which extend, each in a direction going from the rear face 102 toward the front face 101, and projecting relative to the retaining bottom 129. More particularly, the first tab 130 and the second tab 230 are diametrically opposed with respect to the opening 129b. Furthermore, the free ends of the first tab 130 and of the second tab 230, respectively called first end 130a and second end 230a, are internally curved so as to be able to trap a screw or a bolt inserted into the opening in a direction going from the front face 101 toward the rear face 102.

Advantageously, the first tab and the second tab are obtained by cutting the first wall and the second wall, respectively. In other words, the first tab and the second tab are coplanar with the first wall and the second wall, respectively.

Whatever the example considered, the retaining part 100 can be formed by stamping a metal sheet, and, in particular, a sheet made of hardened steel, for example, of the C67S type.

The present disclosure also relates to a one-piece clamping element 300 intended to cooperate with the retaining part 100.

Figure 8:
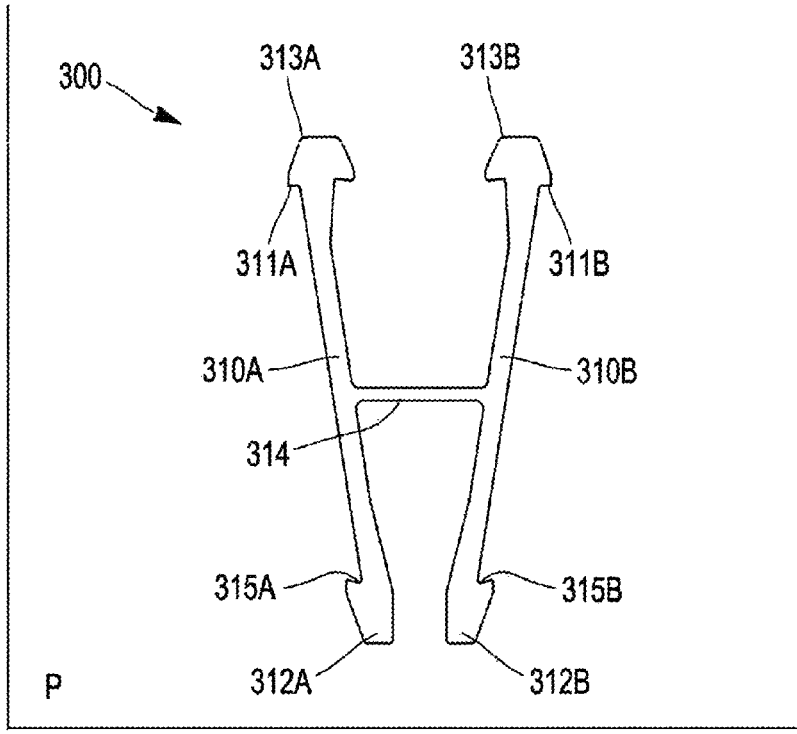
FIG. 8 is a schematic illustration of a clamping element according to a first embodiment of the present disclosure.
Figure 9:
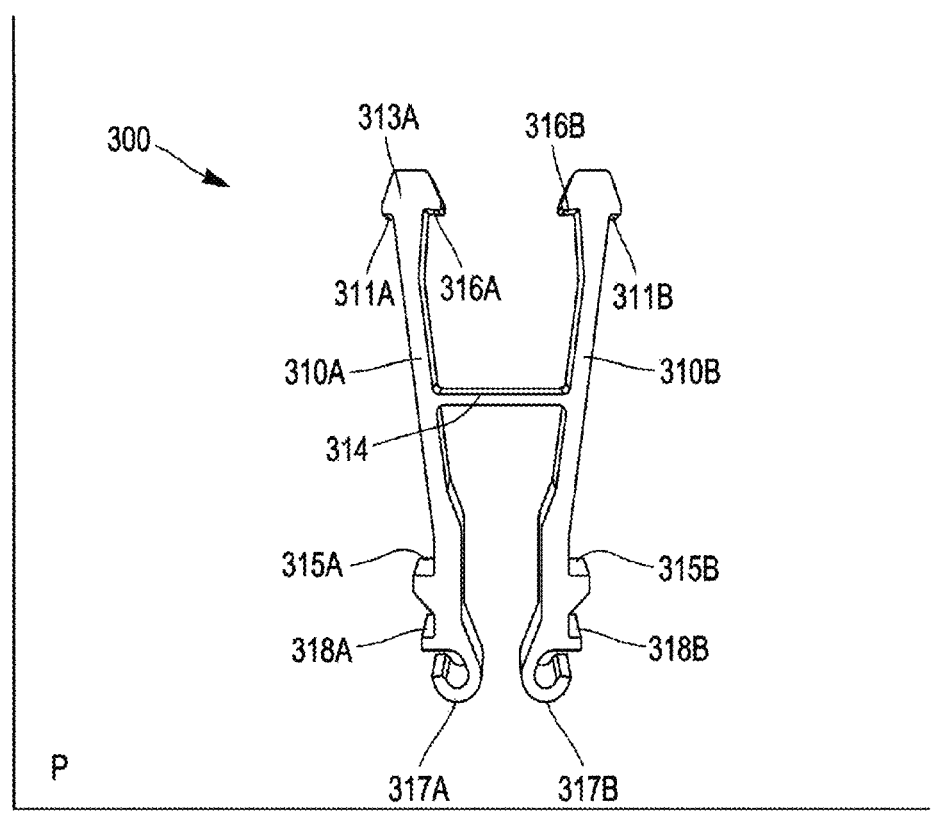
FIG. 9 is a schematic illustration of a clamping element according to a second embodiment of the present disclosure.

In this respect, FIG. 8 and FIG. 9 show a clamping element 300 according to a first and a second embodiment, respectively, according to the present disclosure.

Whatever the example considered, the clamping element 300 comprises two uprights 310A and 310B, mechanically secured to one another, and which extend, in a plane P, each from their first end 312A, 312B toward their second end 313A, 313B in two divergent directions.

"Two divergent directions" means two directions carried by two non-parallel axes. More particularly, the two axes diverge from one another from the first end toward the second end.

The clamping element 300 can comprise a beam 314, which extends in the plane P, and which retains the two uprights 310A and 310B secured to one another.

The first ends 312A and 312B are arranged to allow the clamping element 300 to be attached to a rail, and more particularly to a rail with a U-shaped cross-section. More particularly, the first ends 312A and 312B are arranged to allow the clamping element 300 to be attached to the rail by snap-fastening. In this respect, the first ends 312A and 312B comprise first anchoring means formed by first lateral abutments 315A and 315B.

The second ends 313A and 313B are provided with second anchoring means intended to cooperate with the retaining edge 119A, 119B. In particular, the second anchoring means are arranged to bear against the retaining edge 119A, 119B. In this respect, the second anchoring means can comprise second lateral abutments 311A, 311B.

More particularly, the first lateral abutment 315A, 315B and the second lateral abutment 311A, 311B of the same upright 310A, 310B are facing one another.

Each upright may comprise a mounting abutment 316A, 316B at its second end. In particular, the two mounting abutments 316A and 316B extend internally to the clamping element and are therefore convergent.

As shown in FIG. 9, and in accordance with the second embodiment, the clamping element 300 comprises two mounting hooks 317A, 317B that are bent or curved outwardly.

The clamping element 300 according to the second embodiment may comprise pre-mounting means making it possible to fix the clamping element 300 to the rail without clamping in order to allow prepositioning of the panel on the rail.

The pre-mounting means may, in particular, comprise pre-mounting abutments 318A and 318B arranged to allow the clamping element 300 to be snap-fastened into the rail. In this respect, the pre-mounting abutment 318A, 318B of a given upright is arranged between the first lateral abutment 315A, 315B and the mounting hook of the upright in question. Furthermore, the pre-mounting abutment 318A, 318B of a given upright having the same orientation as the first lateral abutment of the upright in question.

The present disclosure also relates to an attachment kit that comprises the retaining part 100 and the clamping element 300.

The present disclosure also relates to a panel attachment system that comprises at least one attachment kit and at least one rail.

Figure 10:
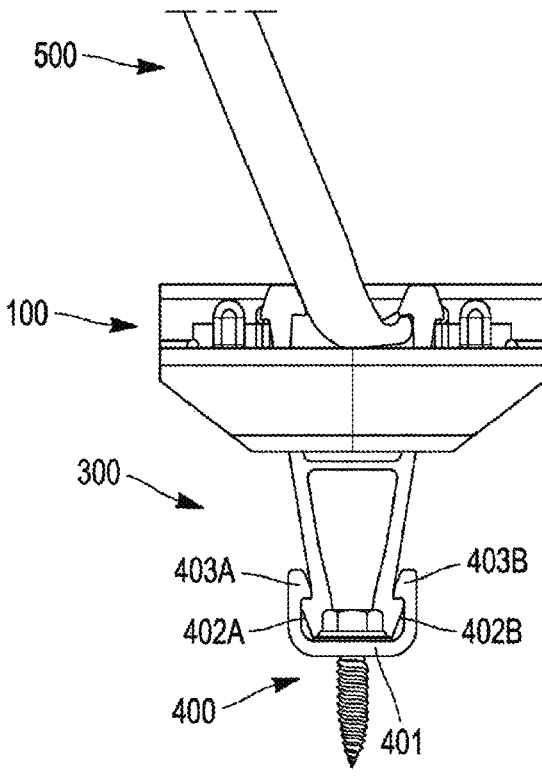
FIG. 10 is a schematic illustration of an assembly, said to be from above, of the clamping element and the retaining part with the rail in order to retain a panel clamped against the rail; this assembly, in particular, involves a retaining part according to the first example and a clamping element according to the first embodiment.

FIG. 10 shows the mounting of a panel, in particular, a solar panel, on a rail 400 according to a so-called top configuration.

The rail 400 comprises a U-shaped cross-section. In this respect, the rail 400 comprises a bottom 401 surmounted by side walls 402A, 402B whose edges, called attachment edges 403A, 403B, are bent or rolled up internally so as to allow snap-fastening of the clamping element 300 by its first anchoring means (the first lateral abutments 315A, 315B).

Thus, the assembly, in particular, comprises snap-fastening the clamping element 300 by its first anchoring means at the attachment edges 403A and 403B of the rail 400. More particularly, the clamping element 300 is arranged close to a panel (not shown) resting by one face, called the contact face, on the rail. In particular, the clamping element 300 is placed against the contour of the panel.

The assembly also includes positioning the retaining part 100 in accordance with the first example. During this installation, the first lateral wing 116 is placed directly above a working face of the panel opposite the contact face. Furthermore, and still during this installation, the second ends of the clamping element 300 are inserted into the passage opened through the rear face 102 of the retaining part 100.

An assembly tool 500 is then implemented so as to place the second anchoring means (the second lateral abutments 311A, 311B) bearing against one and the other of the retaining edges 119A and 119B. The assembly tool 500 may comprise a lever terminating at one of its ends with a hook, and is adapted to exert a force on one and the other of the mounting abutments 316A and 316B by bearing on the mounting beam 127M. If the retaining edge 119A, 119B comprises the contact tips 126, the latter are likely to perforate a passivating oxide layer on the surface of the clamping element and thus allow better electrical contact.

Figure 11:
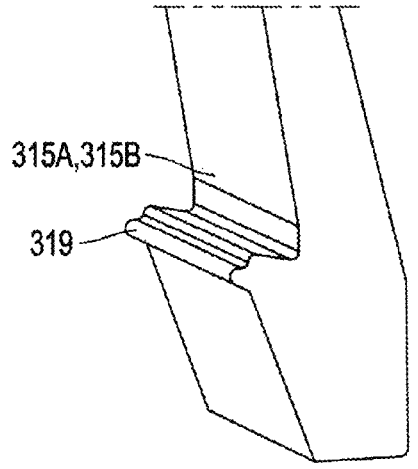
FIG. 11 is a schematic illustration of a projecting rim likely to be considered at the first lateral abutment.

The electrical contact between the rail and the clamping element can, for its part, be improved by forming a projecting rim 319 on the first lateral abutment (FIG. 11). The projecting rim 319 is, in particular, likely to be crushed against the rail when the clamping element is snap-fastened in the rail, and thus makes it possible to establish better electrical contact between the rail and the clamping element.

As soon as the clamping element 300 is snap-fastened in the rail 400 and the second anchoring means bear against the retaining edges, the clamping element 300 is in tension, and, consequently, exerts a force on the retaining edges 119A and 119B. This force results in the panel being clamped between the first lateral wing 116 and the rail 400.

More particularly, the first lateral wing, bearing against the working face of the panel, retains the latter bearing against the rail 400. The consideration of the bent tabs 125 makes it possible to scratch the frame of the panel and thus to establish better electrical contact between the retaining part and the panel.

The improvement of the electrical contacts with the bent tabs 125, the contact tips 126 and the projecting rims 319 can advantageously be used to ground the panel.

Such an arrangement has less sensitivity with regard to temperature variations and thus offers more durable clamping than that exerted by way of a screw or a bolt.

Furthermore, the extent of the first lateral wing allows a better distribution of the retaining force on the working face of the panel.

Finally, the configuration proposed in the present disclosure makes it possible to consider rails of a reasonable width.

The assembly shown in FIG. 10 could also implement a retaining part according to the second example so that the part retains, by way of its first wing, a first panel, and by way of its second wing, a second panel adjacent to the first panel.

This assembly method is particularly suitable when it comes to fixing panels, and, in particular, fixing solar panels on a roof.

Figure 12:
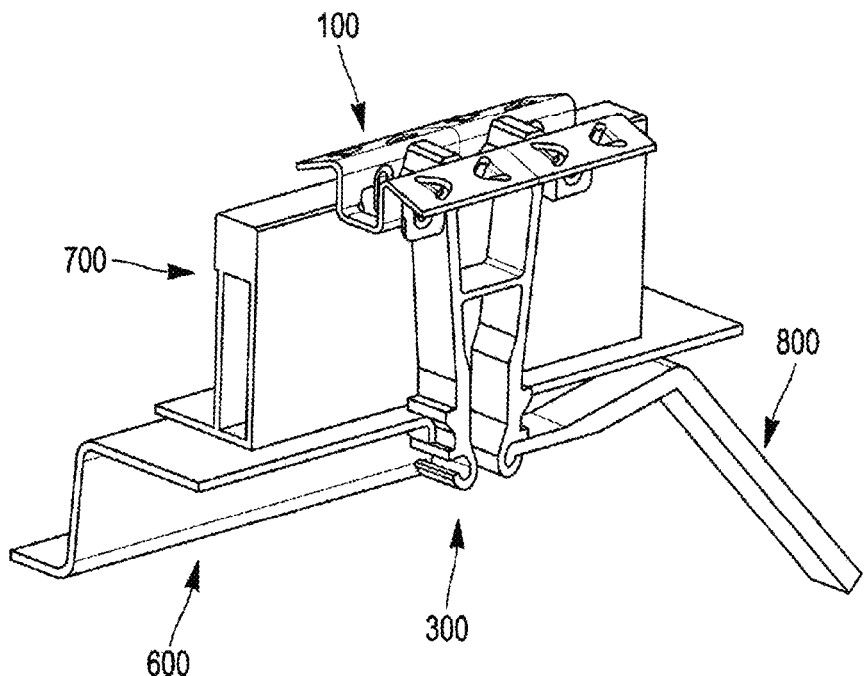
FIG. 12 is a schematic illustration of an assembly, said to be from below, of the clamping element and the retaining part with the rail in order to retain a panel clamped against the rail; this assembly, in particular, involves a retaining part according to the first example and a clamping element according to the second embodiment.

FIG. 12 shows the mounting of a panel, in particular, a solar panel, on a rail 600 according to a so-called bottom configuration. The assembly shown in FIG. 12 implements the clamping element according to the second embodiment.

The rail 600, in particular, comprises snap-fastening means to allow the insertion of the clamping element 300 by snap-fastening. In particular, the assembly comprises positioning the clamping element 300 in the rail 600 in a position called the pre-mounting position. In particular, the clamping element 300 is snap-fastened by way of these mounting abutments 316A and 316B in the rail 600.

The retaining part 100 is also put in place. During this installation, the first lateral wing 116 is placed directly above a working face of the panel opposite the contact face. Furthermore, and still during this installation, the second ends of the clamping element 300 are inserted into the passage opened through the rear face 102 of the retaining part 100. In particular, this placement is carried out so as to place the second anchoring means (the second lateral abutments 311A, 311B) bearing against one and the other of the retaining edges 119A and 119B.

An assembly tool 800 is then implemented so as to snap-fasten the clamping element in the rail 600 by way of the first anchoring means (the first lateral abutments 315A, 315B).

The assembly tool 800 may comprise a lever, one of its ends being arranged to cooperate with one and the other of the mounting hooks 317A, 317B. In particular, the assembly tool 800 is adapted to exert a force on one and the other of the mounting hooks 317A, 317B.

As soon as the clamping element 300 is snap-fastened in the rail 400 and the second anchoring means bear against the retaining edges, the clamping element 300 is in tension, and, consequently, exerts a force on the retaining edges 119A and 119B. This force results in the panel being clamped between the first lateral wing 116 and the rail 400.

More particularly, the first lateral wing, bearing against the working face of the panel, retains the latter clamped against the rail 400.

The assembly shown in FIG. 12, like that of FIG. 10, can also implement contact tips 126, projecting rims 319 and bent tabs 125.

The assembly shown in FIG. 12 implements a retaining part according to the second example so that the part retains, by way of its first lateral wing, a first panel, and by way of its second wing, a second panel adjacent to the first panel.

However, a retaining part in accordance with the first example or the third example can also be envisaged.

Alternatively, and when a retaining part according to the third example is considered, it is possible to consider the retaining part to a rail by way of a screw or a bolt and an anchoring element.

Figure 13:
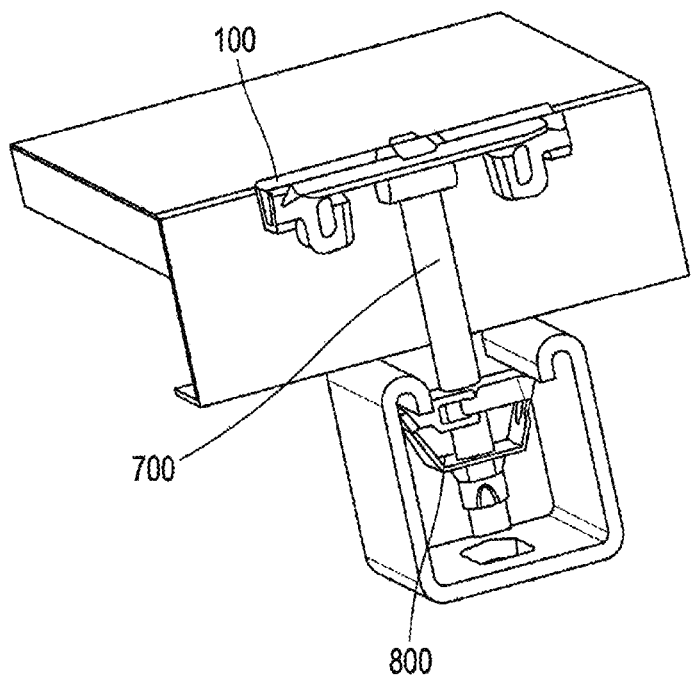
FIG. 13 is an illustration of the implementation of the retaining part according to the third embodiment for retaining a photovoltaic panel on a rail, the retaining part cooperating with a bolt and an anchoring element.

In this respect, FIG. 13 is an illustration of the cooperation between a retaining part 100, a bolt 700 and an anchoring element 800 for retaining a photovoltaic panel on a rail 900. In particular, the bolt 700 is inserted into the opening 129b and cooperates by screwing with the anchoring element 800. The anchoring element is for its part retained in a groove, called the main groove of the rail, so that the bolt, forming a tie rod, is in tension and thus imposes a bearing force on the first lateral wing of the retaining part 100 against the frame of an adjacent photovoltaic panel.

Figure 14:
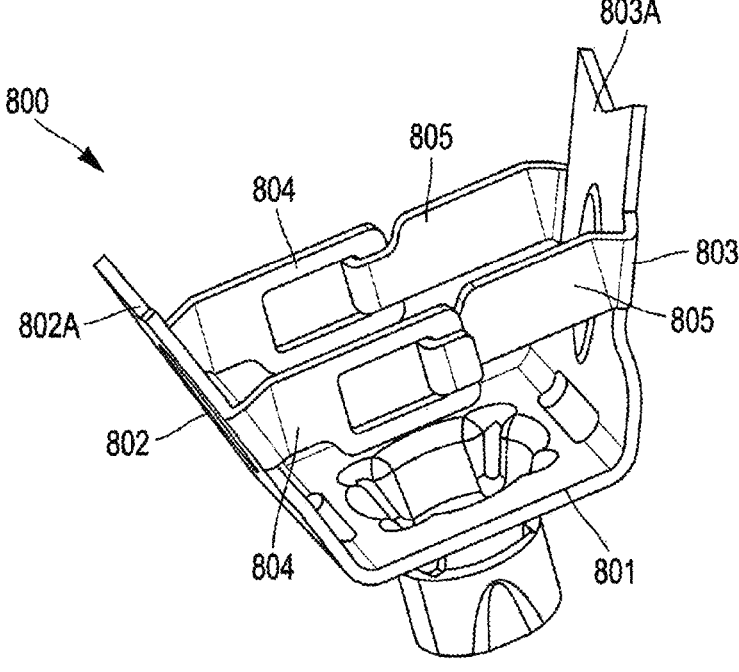
FIG. 14 is a perspective illustration of the anchoring element of FIG. 13.

According to a non-limiting example and as shown in FIG. 14, the assembly tool 800 may comprise an essentially flat main plate 801 as well as two lateral wings 802 and 803 laterally extending the main plate 801 by two opposite sides, called lateral sides. In particular, the two lateral wings 802 and 803 each extend so as to diverge toward their contact end 802A and 803A.

Finally, the anchoring element also comprises two retaining elements directly connecting the two lateral wings 802 and 803, and configured to oppose a spreading force likely to be exerted on the two lateral wings 802 and 803. In this respect, a retaining element can comprise two tabs called first tab 804 and second tab 805, respectively, which extend, perpendicularly to the lateral sides, toward one another, each from a lateral wing 802 and 803. In particular, the first tab 804 and the second tab 805 comprise stop means arranged at the free ends of one and the other of the tabs and configured to oppose the separation of the two lateral wings 802 and 803 once a spreading force is imposed on the lateral wings 802 and 803. More particularly, the stop means comprise a hook 805A and a window 804A. The hook 805A is arranged at the free end of the second tab 805, while the window 804A is arranged at the free end of the first tab 804. The hook 805A is engaged in the window, which advantageously has a rectangular shape.

The present disclosure also relates to a method for mounting photovoltaic panels on rails. In particular, the method comprises placing a first panel on rails and securing the panel to the rails by way of clamping elements and retaining parts. More particularly, the first lateral wing of the retaining parts used to retain the first panel on the rails bears against the peripheral frame of the first panel by way of clamping elements.

The method comprises positioning a second photovoltaic panel in a position adjacent to the first photovoltaic panel. More particularly, the second panel is initially engaged obliquely by one side of its peripheral frame under the second lateral wing(s) of the retaining parts, which bear by their first lateral wings against the peripheral frame of the first panel. Secondly, the second photovoltaic panel is folded down parallel to the first photovoltaic panel so as to be clamped against the rail by the considered retaining parts.

Of course, the present disclosure is not limited to the described embodiments and variant embodiments may be envisaged without departing from the scope of the invention as defined by the claims.

The invention claimed is:

1. A retaining part, preformed and one-piece, of an attachment kit configured to retain a panel clamped by a contact face of the panel, against a rail, the retaining part comprising:

a main part extending along an elongation axis A, the main part including a first side wall, the first side wall having a first inner face and a first outer face as well as a first upper edge parallel to the elongation axis A and opposite a rear face of the main part; the main part further including two transverse walls, perpendicular to the elongation axis and delimiting a passage open through the rear face for the insertion of a clamping element of the attachment kit; the transverse walls including a retaining edge defining a retaining plane, opposite the rear face, and against which the clamping element inserted through the rear face is configured to exert a force in a direction of the rear face; and a first lateral wing laterally extending the main part from the first upper edge, the first lateral wing being intended to bear by a bearing surface against a working face of the panel opposite the contact face of the panel.

2. The retaining part of claim 1, wherein guide faces of the transverse walls face one another and each comprise, from the retaining edge toward an inlet edge opposite the retaining edge, a retaining section, a guide section and an inlet section, the guide section being flat and perpendicular to the elongation axis, and the inlet section being of convex shape so as to limit any contact between the clamping element and a rim of the inlet edge during insertion of the clamping element into the passage through the rear face (102).

3. The retaining part of claim 2, wherein the retaining section is also of convex shape so that the retaining plane is not perpendicular to the guide section.

4. The retaining part of claim 1, wherein the retaining section comprises contact tips projecting relative to the retaining plane.

5. The retaining part of claim 1, wherein the first side wall also comprises at least one guide fin formed by a bent section of the first side wall and arranged to center and guide the clamping element during its-insertion of the clamping element into the passage through the rear face.

6. The retaining part of claim 5, wherein the at least one guide fin is oriented toward the rear face and bent in a direction opposite the first inner face.

7. The retaining part of claim 1, wherein the angle between the first side wall and the first lateral wing is less than 90°.

8. The retaining part of claim 1, wherein the first lateral wing comprises one or more bent tabs projecting toward the rear face and ending in a tip so as to be able to scratch the panel when the first lateral wing bears against the panel.

9. The retaining part of claim 1, wherein the main part comprises a second side wall having a second inner face and a second outer face as well as a second upper edge parallel to the elongation axis and opposite a rear face of the main part, and a second lateral wing is arranged projecting with respect to the second outer face and extends the second side wall from the second upper edge of the second side wall.

10. The retaining part of claim 9, wherein the retaining part is arranged so that the first side wall and the first lateral wing are symmetrical, respectively, to the second side wall and the second lateral wing with respect to a plane of symmetry median to a first inner surface and to a second inner surface.

11. The retaining part of claim 10, wherein the first side wall and the second side wall are parallel to one another.

12. The retaining part of claim 9, wherein the transverse walls extend between the first inner surface and the second inner surface.

13. The retaining part of claim 9, wherein beams provide a fixed mechanical link between the first side wall and the second side wall.

14. The retaining part of claim 13, wherein the beams are arranged on the rear face of the main part.

15. The retaining part of claim 14, wherein one beam among the beams is a mounting beam arranged halfway between the two transverse walls.

16. The retaining part of claim 9, wherein the retaining part comprises a retaining bottom having a flat shape and extending from and perpendicular to the first inner face.

17. The retaining part of claim 16, wherein the retaining bottom comprises a through opening.

18. The retaining part of claim 16, wherein the retaining bottom connects the first inner face with the second inner face.

19. The retaining part of claim 18, wherein the retaining part comprises captive means configured to trap a bolt or a screw inserted in the through opening in a direction from the front face to the rear face.

20. The retaining part of claim 19, wherein the captive means comprise a first tab and a second tab each extending in a direction from the rear face toward the front face and projecting relative to the retaining bottom.

21. A one-piece clamping element intended to cooperate with the retaining part according to claim 1 for clamping a panel by its contact face against a U-section rail, the clamping element comprising two uprights mechanically secured to one another and which extend, in a plane P, each from their first end toward their second end in two divergent directions; the first ends comprising first anchoring means arranged to allow the clamping element to be attached to the rail by snap-fastening, the second ends comprising second anchoring means intended to cooperate with one of the retaining edges when the two uprights are inserted into the passage through the rear face.

22. The clamping element of claim 21, wherein the clamping element comprises a beam extending in the plane P and securing the two uprights together.

23. The clamping element of claim 21, wherein the first anchoring means and the second anchoring means of a given upright comprise, respectively, a first lateral abutment and a second lateral abutment facing one another.

24. The clamping element of claim 23, wherein the uprights comprise pre-mounting means for fixing the clamping element (300) to the rail without clamping to allow prepositioning of the panel on the rail.

25. The clamping element of claim 21, wherein each upright comprises a mounting hook in an extension of its second end, the two mounting hooks being bent or curved outwardly.

26. The clamping element of claim 24, wherein the pre-mounting means for a given upright are arranged between the mounting hook and the first lateral abutment.

27. An attachment kit, which comprises:
a retaining part, preformed and one-piece, the retaining part comprising:
a main part extending along an elongation axis A, the main part including a first side wall, the first side wall having a first inner face and a first outer face as well as a first upper edge parallel to the elongation axis A and opposite a rear face of the main part; the main part further including two transverse walls, perpendicular to the elongation axis and delimiting a passage open through the rear face for the insertion of a clamping element of the attachment kit; the transverse walls including a retaining edge defining a retaining plane, opposite the rear face, and against which the clamping element inserted through the rear face is configured to exert a force in a direction of the rear face; and
a first lateral wing laterally extending the main part from the first upper edge, the first lateral wing being intended to bear by a bearing surface against a working face of the panel opposite the contact face of the panel; and
a one-piece clamping element configured to cooperate with the retaining part for clamping a panel by its contact face against a U-section rail, the clamping element comprising two uprights mechanically secured to one another and which extend, in a plane P, each from their first end toward their second end in two divergent directions; the first ends comprising first anchoring means arranged to allow the clamping element to be attached to the rail by snap-fastening, the second ends comprising second anchoring means intended to cooperate with one of the retaining edges when the two uprights are inserted into the passage through the rear face.

28. A panel attachment system, comprising at least one attachment kit according to claim 27 and at least one U-section rail.

29. A flat surface provided with a set of panels arranged in a matrix manner on regularly spaced and parallel rails, each panel being clamped against a rail on which it rests by way of an attachment kit according to claim 27.

* * * * *